Patented Apr. 19, 1938

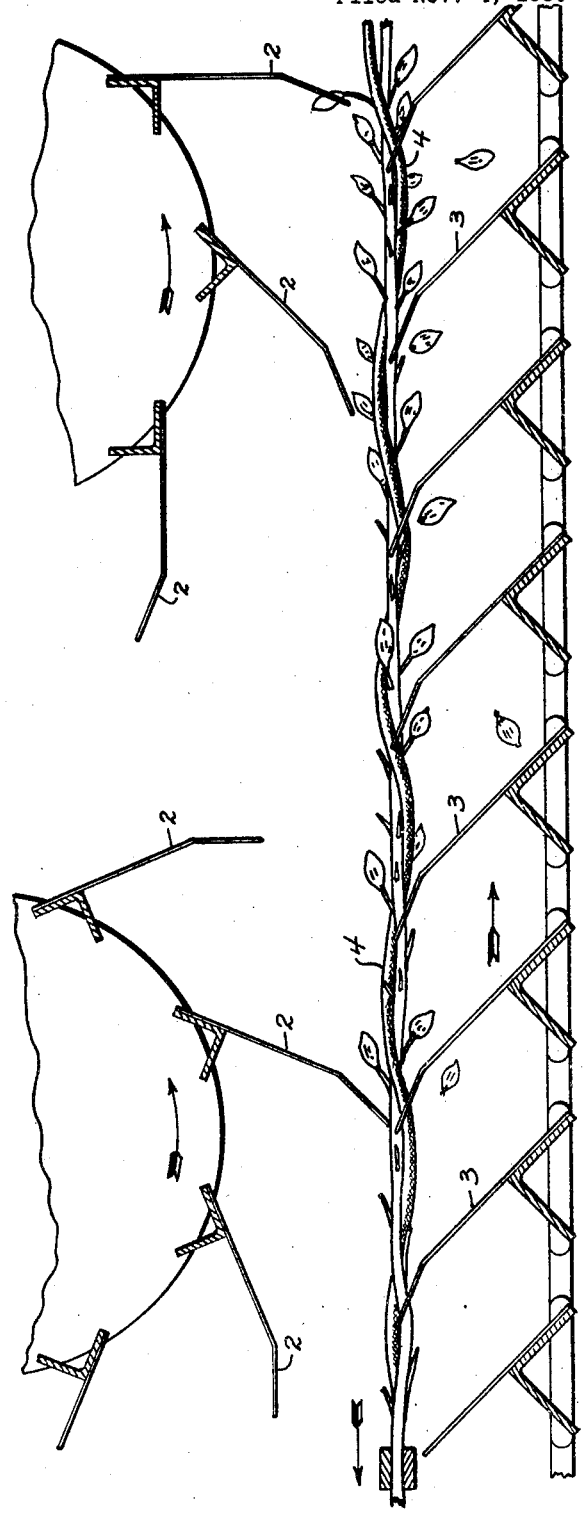

2,114,712

UNITED STATES PATENT OFFICE 2,114,712

METHOD OF KEEPING THE PICKING FINGERS OF HOP PICKING MACHINES CLEAN

Emil Clemens Horst, San Francisco, Calif.

Application November 4, 1936, Serial No. 109,120

1 Claim. (Cl. 130—30)

This invention relates to a method and means for keeping the picking fingers of hop picking machines clean.

The picking of hops by means of machinery is now a comparatively old art, as machine picking has been in continuous use on a comparatively large scale in California and other western States for twenty-five years or more; the type of machine employed being that illustrated in Patents Numbers 1,054,119 and 1,054,551. These machines are large affairs and in general comprise a main elongated frame across which are journaled upper and lower rows of picking drums over and between which an endless chain conveyor travels. This conveyor is provided with a succession of gripper bars to which the hop vines are secured and the vines are thus pulled over and between the drums during their passage through the machine. The drums are provided with spaced rows of V-shaped flexible wire fingers which comb the vines as they pass over and between the drums. The hops are thus combed or stripped from the vines and fall downwardly between the drums onto separator belts disposed below the drums where leaves and other foreign matter are removed.

In the picking of hops by machines of this character the V-shaped picking fingers become coated with oil, sap, and other gummy substances and to this will adhere fiber and other foreign material. This coating gradually builds up until the fingers become so clogged that they become substantially inoperative and at that time it becomes necessary to shut down the machine and clean the fingers. This is a slow operation and takes considerable time as there are literally thousands of fingers to be cleaned.

The object of the present invention is to combine with the hop vines as they are fed into the machine a material which will function as a cleaning or rubbing agent to the extent that it has a sufficient abrasive or rubbing action on the fingers to keep any oil or gummy substance from collecting or coating the same. The invention is shown by way of illustration in the accompanying drawing which is a diagrammatic view showing the manner in which the coir twine is fed through the picking machine in unison with the hop vines to be picked.

From actual practice I have found that coir twine or cord is an ideal material for this purpose. Coir twine or cord consists of fibers of the cocoanut twisted into a cord. The fibers are tough and rather coarse and stiff. The cord is intertwined with the hop vines prior to feeding them through the picking machine. During the passage of the vine through the machine the picking fingers indicated at 2 and 3 will come in rubbing contact with the twine or cord shown at 4 and any sticky or gummy material adhering to the fingers will thus be rubbed off and the fingers will constantly and continuously keep clean.

The hop vines to be picked are usually from ten to fifteen feet long. One or more pieces of coir cord of approximately the same length may be tied to the butt end of the vine, intertwined with it or fastened to each gripper bar, or the coir cord may be used in the field at the time the trellises are strung so that as the vines grow they will become intertwined with the cord. By feeding the cord through the picking machine in unison with the vines the fingers are automatically kept clean and no accumulation can build up and render the fingers inoperative.

Be that as it may, the use of a cord of this character has proven a great discovery as it keeps the picking fingers thoroughly clean at all times and obviates the necessity of shutting down for this purpose. Shut downs of this character are costly, as the hop season is short and the vines must be picked. Any shut down of the machine is, accordingly, costly as a portion of the crop may become over-ripe or dried out and is thus unfit for picking.

While coir twine has proven the best for the purpose described, other cord or twine twisted or formed from a coarse fibrous material may be employed, and while this and other features of the invention have been more or less specifically described, I wish it understood that changes in material may be resorted to within the scope of the appended claim.

Having thus described my invention, what I claim and desire to secure by Letters Patent is:

A method of preventing any gummy substance from coating or accumulating on the picking fingers of a hop picking machine, which consists in passing through the machine while vines are being pulled through the machine and while the vines are being combed by the picking fingers, in unison with the hop vines a plurality of coir cords which are attached to the vines and intertwined therewith and upon which the fingers rub while combing the vines during the passage of the vines through the machine, thereby removing any gummy substance tending to adhere to the fingers.

EMIL CLEMENS HORST.